CARD SUPPORTING DEVICE

Filed March 2, 1956

3 Sheets-Sheet 1

INVENTOR
RICHARD P. SCHOLFIELD

BY Cushman, Darby & Cushman
ATTORNEYS

INVENTOR
RICHARD P. SCHOLFIELD

BY Cushman, Darby & Cushman
ATTORNEYS

Dec. 27, 1960 R. P. SCHOLFIELD 2,966,156

CARD SUPPORTING DEVICE

Filed March 2, 1956 3 Sheets-Sheet 3

INVENTOR
RICHARD P. SCHOLFIELD

BY Cushman, Darby & Cushman
ATTORNEYS 2,966,156

CARD SUPPORTING DEVICE

Richard P. Scholfield, 40 Bank St., White Plains, N.Y.

Filed Mar. 2, 1956, Ser. No. 569,000

2 Claims. (Cl. 129—16)

The present invention relates to a card supporting device and more particularly to a card record or file tray which is so constructed and arranged that a plurality of cards may be filed therein, and any desired card may be shifted in the tray so that it will remain securely in offset relation to the balance of the cards to facilitate signaling thereof.

It is often desirable that one or more cards in a file be offset so that the exposed portions will act as a signal. Various types of file trays have been provided hereto for that purpose, wherein a card may be moved from its normal position into a signaling position; but those not having special holding devices, such as inserted corner blocks or notched cards, have depended largely upon the friction of one card against the other to hold the signal card in place, so that the normal use of the card file for removing or inspecting other cards has often resulted in the signal card being accidentally disturbed, thereby returning to its normal position.

With the above in mind, the principal object of the present invention is to provide a card record tray for carrying tabulating cards in such a manner so as to facilitate fast and easy offsetting, wherein any given card may be offset to a signaling position and be held positively during normal usage of the file and cannot be inadvertently returned to its regular filing position.

It is also a most important object of the invention that no modification whatsoever of the standard file card is required when used with this invention.

A further object is to provide a simple, inexpensive and efficient construction to satisfy the above purposes and one which lends itself to innumerable uses and various systems of filing cards.

An additional object of the invention is to keep the space requirements of the offset feature to a minimum.

Still further objects and the entire scope of applicability of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent as the description herein progresses.

Reference is made to the accompanying drawings, wherein.

Bearing in mind that this invention basically consists of a card supporting device or tray adapted to support the usual rectangular file card in inclined relation with respect to the horizontal when filed in either the offset signaling or normal position, it would be an obvious modification incorporated in the present invention to file the cards on either their narrowest or widest edges.

Figures 1, 2:
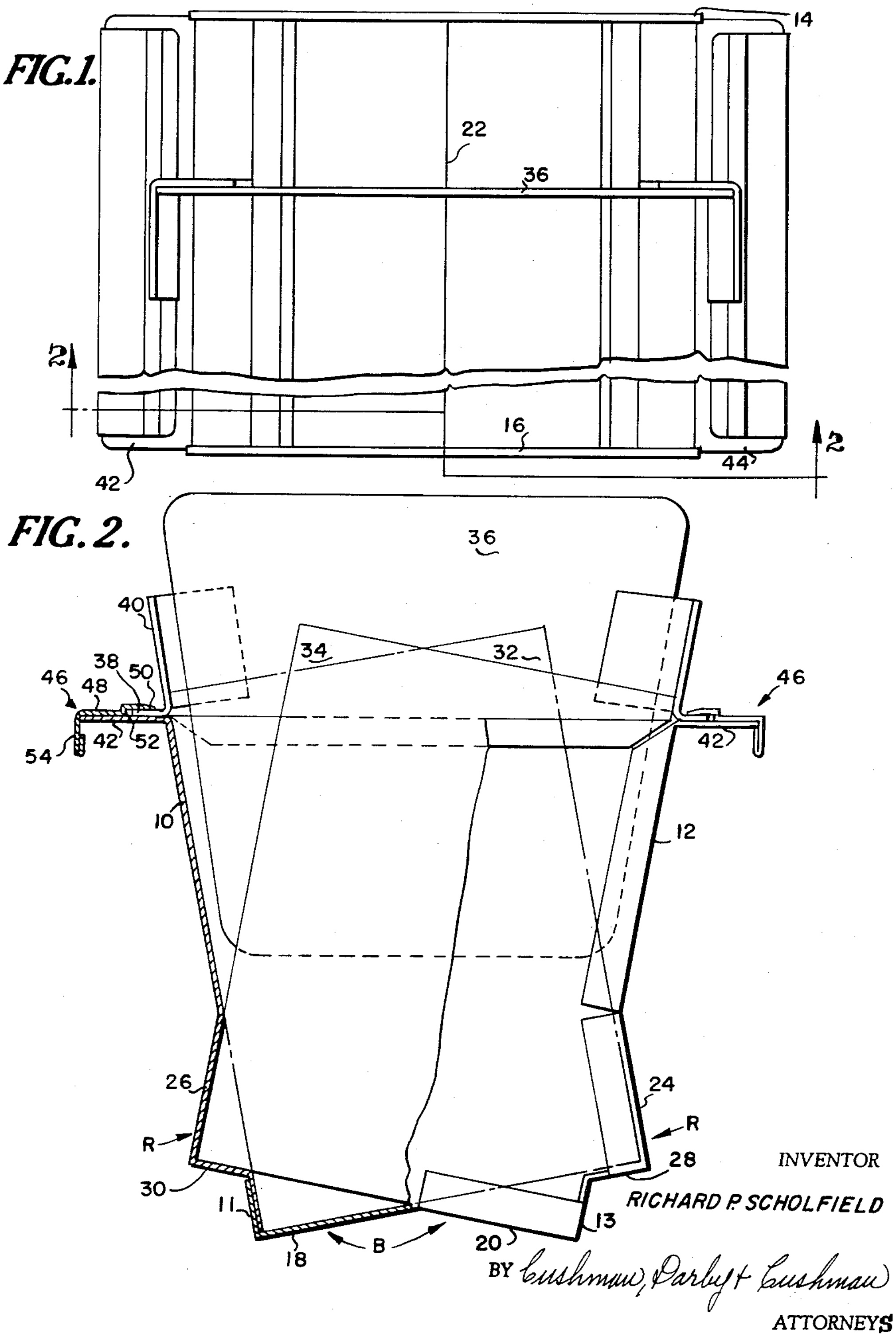
Figure 1 is a top plan view partly in section of a card record tray in combination with a follower member constructed in accordance with the present invention.
Figure 2 is a view in cross-section of the same taken along line 2—2 of Figure 1 illustrating the manner in which the cards are positioned in the tray to perform the service hereinabove described.

Referring now to Figures 1 and 2 of the accompanying drawings, a card record tray is shown having downwardly converging side wall members 10, 11 and 12, 13, end walls 14 and 16 and a base member B, which is defined by a pair of downwardly and outwardly inclined planar members 18 and 20. The members 18 and 20 are equally and oppositely inclined with respect to the horizontal and intersect at 22 to form a longitudinally extending ridge. Lower side wall members 11 and 13 are positioned perpendicular to the members 18 and 20 respectively, and extend upwardly therefrom. The upper side wall members 10 and 12 are merely continuations of the lower side wall members 11 and 13; being separated by offset angular recesses or shelves R. The upper sidewall sections 24 and 26 of the recessed shelves R extend parallel to opposite side wall members 10, 11 and 12, 13 respectively. Moreover, each of the lower shelf ledge portions 28 and 30 form right angles with adjacent upper sidewall sections 24 and 26 and are likewise coplanar with respective opposite planar members 18 and 20. Thus, the upper and lower portions of each of the side wall members is positioned parallel to an opposite upper sidewall section so that the opposite side edges of the cards, in either of the two positions, are engaged by parallel walls.

As a result of the above construction, card 32 is retained in position by the upper and lower side wall members 10 and 11 and the parallel upper sidewall section 24, as seen in Figure 2. Furthermore, the lower edge of card 32 makes a line contact with the planar member 18 and the lower shelf or ledge portion 28. Likewise, card 34 is engaged by the side wall members 12 and 13, the opposite parallel upper sidewall section 26 and is supported by planar member 20 and the lower shelf or ledge portion 30. Thus, it will be noted that a card could not be displaced from its initial position without first being lifted above either the lower side wall member 11 or 13 and repositioned accordingly. This means that the cards will be arranged in oppositely inclined relation in either the normal or signaling position, always having an upper side edge supportingly engaged by an upper side wall member and, therefore, never being supported at any time with side edges vertical or top and bottom edges horizontal.

In combination with the card record tray, a card follower member 36 may be employed for the longitudinal indexing of the cards, as seen in Figures 1 and 2 of the attached drawings. In Figure 2, the follower member 36 is positioned inside the card supporting device and is shown as an inverted trapezoid having parallel upper and lower edges with downwardly inclined side edges that are parallel with respective adjacent side wall members 10 and 12. With more particular reference to the drawings, it will be noted that the follower member 36 is adapted to cooperate with the tray by means of laterally projecting bottom flanges 38 which are formed from the edge clips 40 of the follower member 36. The side wall members 10 and 12 have outwardly projecting ledges 42 formed adjacent their upper ends. Each of the ledges has an angled strip 46 secured thereon, wherein the leg 48 extends inwardly from the outer edge of ledge 42 and has a free end 50 vertically spaced from the ledge to form a groove 52 therewith. The free end 50 defining the groove 52 is adapted to receive and resiliently engage the bottom flange 38 of the edge clip 40, thereby allowing the flange 38 to ride on the upper surface of ledge 42, and underneath the inwardly projecting free end 50 of the leg 48. The opposite leg 54 of the angled strip 46 extends downwardly beyond the ledge 42 to form a right angle therewith and is unfolded for reenforcement.

There are, of course, many possible variations of the card record tray heretofore described. The tray would, nevertheless, maintain a transverse cross-sectional configuration similar to the one shown in Figure 2 throughout the entire longitudinal curvature of said base member.

Figures 3, 4:
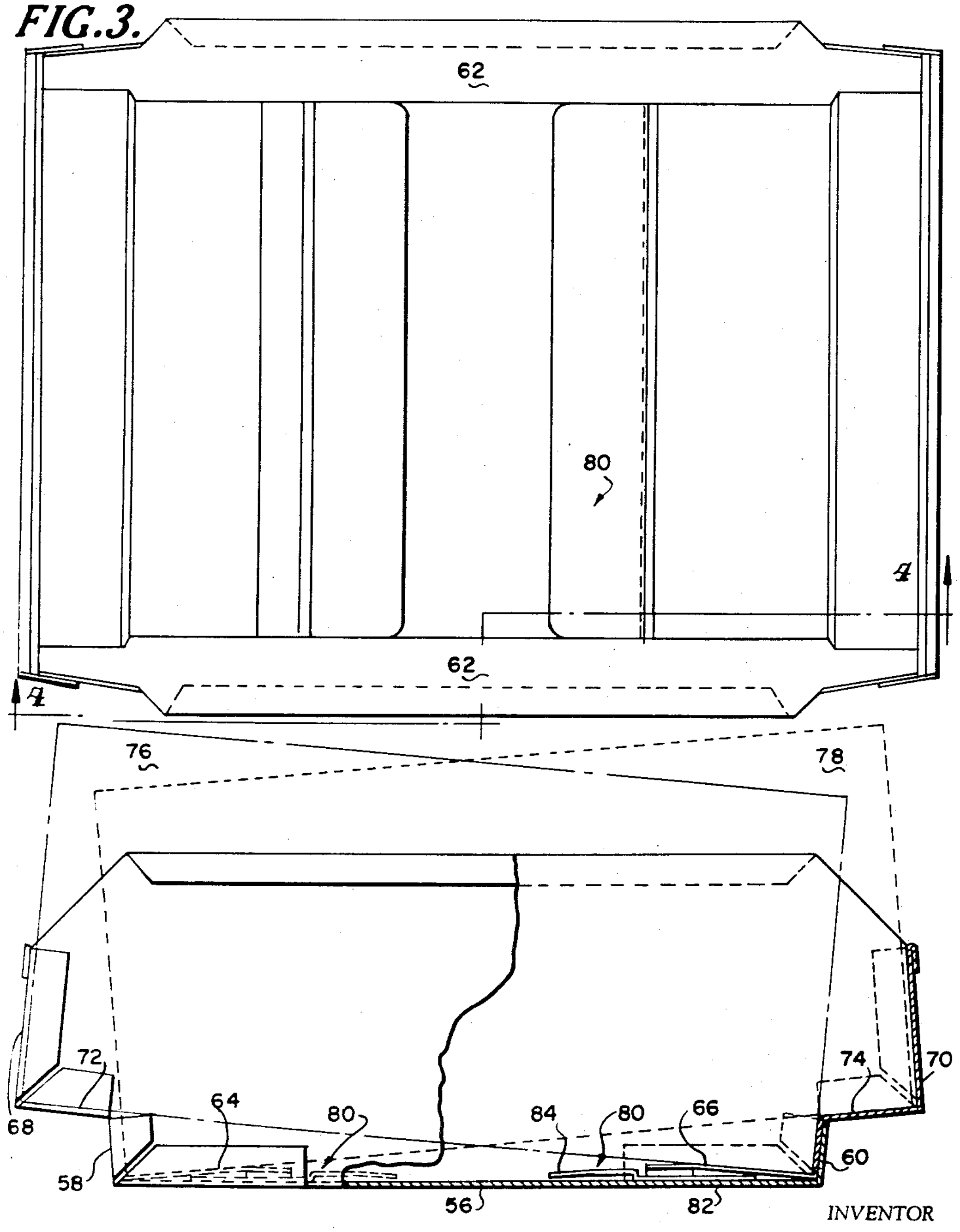
Figure 3 is a top plan view showing a modified construction of the card record tray.
Figure 4 is a cross-sectional view of the same taken along line 4—4 of Figure 3 illustrating the manner in which the cards are supported along their widest edge.
Figure 5:
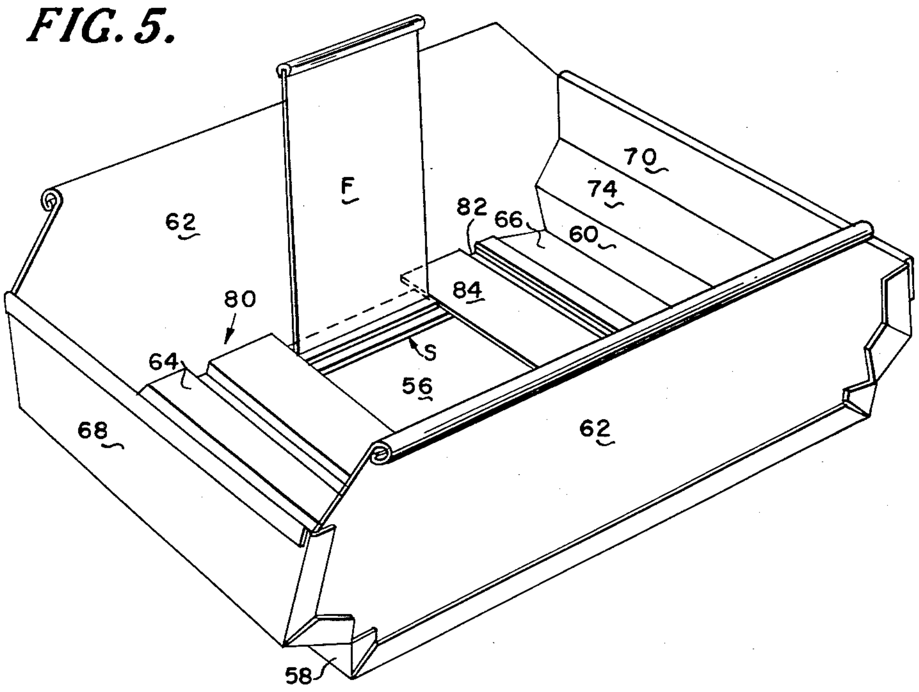
Figure 5 is a perspective view showing the subject matter of Figures 3 and 4.
Figure 6:
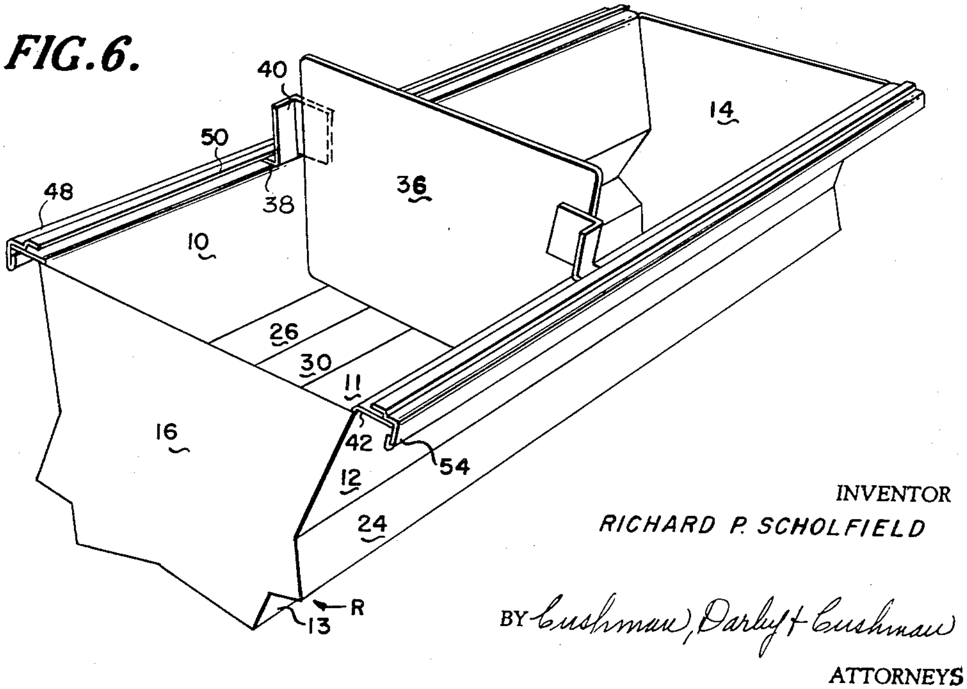
Figure 6 is a perspective view illustrating the subject matter of Figures 1 and 2 respectively, formed in accordance with the present invention.

A modification of the present invention is illustrated in Figures 3, 4, and 5, wherein the card record tray has a bottom member 56, side wall members 58 and 60, and end members 62. A false bottom card supporting base member is formed from downwardly and outwardly inclined opposite planar members 64 and 66, the angular disposition of each of said planar members being the same with respect to the bottom member 56. The side wall members 58 and 60 are positioned adjacent the planar members 64 and 66 respectively, and extend upwardly at right angles therefrom. A pair of secondary side wall sections 68 and 70 are laterally and outwardly disposed of the side wall members 58 and 60, whereby the upper end of side wall member 58 is connected to the lower end of the secondary side wall section 68 by means of a card supporting ledge portion 72. Similarly the upper end of side wall member 60 is connected to the lower end of the secondary side wall section 70 by means of the card supporting ledge portion 74. The previously described card supporting shelf or ledge portions 72 and 74 are disposed at right angles to adjacent secondary side wall sections 68 and 70 and are coplanar with the opposite planar members 66 and 64 respectively.

Accordingly, each of the secondary side wall sections are parallel to corresponding opposite side wall members so that the opposite side edges of the cards 76 and 78, in either the regular or offset position, are engaged by parallel walls. Similarly, the lower edges of the cards 76 and 78 make a line contact with one planar member and the corresponding card supporting ledge portion which is coplanar therewith. Therefore, it will be noted that a card could not be displaced from its initial position without first being lifted and then replaced in offset relation.

The previously described false base member, consisting of planar members 64 and 66, is constructed in such a way that a follower support member S may be positioned between and below the aforesaid planar members of said base member. The bottom member 56 of the tray supports a pair of longitudinally extending guide wall members 80 that are disposed between and below the planar members 64 and 66, wherein each of the guide wall members has an outwardly extending lower supporting leg 82 positioned adjacent the bottom member 56 and an inwardly projecting upper guide flange 84 vertically spaced therefrom for resiliently engaging a follower support member S that rides on the bottom member 56, between and beneath each of the upper flanges 84. Moreover, the lower supporting leg 82 extends beneath the planar members which are constructed in the form of a shelf member positioned above the bottom member 56 of the tray in accordance with the invention.

The construction wherein the guide wall members 80 are positioned between and below the planar members does not materially increase the total space requirements of a tray and, therefore, is considered commercially superior when used with the type of tray illustrated in Figures 3, 4 and 5 of the accompanying drawings.

The present invention has succeeded in positioning a card in a tray so that it will remain in its signal position and not be affected by any movement of the other cards, whereby the card is completely supported and any frictional movement caused by withdrawing or inserting other cards will not move the signal card from its offset position. Hence, any card will remain in either its normal or its signal position until it is positively moved therefrom by the operator. Furthermore, the card supporting trays hereinbefore described have many advantages, such as to facilitate the handling of cards for reference within the file or for removal therefrom, it may direct attention to certain cards remaining in the file, it reduces to a minimum the time required for refiling a card that has been placed in an offset position, it requires no modification of the standard card whatsoever, and it permits cards to be filed as in an ordinary file without reference to any signaling system.

It is also to be understood that although two preferred embodiments of the invention have been shown in the drawings and described with considerable particularity in the foregoing specification, the invention is not limited to the specific details of construction shown and described, but includes all modifications coming within the scope of the appended claims and their equivalents.

I claim:

1. A card file tray for supporting a plurality of rectangular cards in symmetrically opposed off-set signalled relation comprising: a pair of card supporting bottom members each having an oppositely disposed planar surface inclined downwardly and outwardly from the center of said tray at equal angles with respect to the horizontal, a pair of upwardly extending lower sidewall members each joining the outer extremity of an adjacent bottom member at right angles to the card supporting planar surface thereof for defining a lower supporting shelf therewith which will fully engage the depressed lower corner edge of a card, said lower shelves each being spaced equidistantly from the center of said tray, a pair of card supporting ledges each extending outwardly and upwardly from the upper end of an adjacent lower sidewall member in the same plane as the similarly inclined planar surface of said card supporting bottom member remote therefrom, a pair of upper sidewall sections each joining the outer end of an adjacent supporting ledge at a point spaced equidistantly from the center of said tray and extending upwardly at right angles therefrom in a direction parallel to the opposite lower sidewall member for defining an upper supporting shelf which will fully engage the opposite raised lower corner edge of said card, and a pair of secondary sidewalls each extending outwardly and upwardly from the upper end of an adjacent upper sidewall section in a plane coextensive with that of the adjacent lower sidewall member for supportingly engaging the upper side edges of said card.

2. A card file tray as defined in claim 1 wherein each of said upper sidewall sections are of a greater dimension than either of said lower sidewall members.

References Cited in the file of this patent

UNITED STATES PATENTS

| | | |
|---|---|---|
| 358,240 | Woodruff | Feb. 22, 1887 |
| 814,817 | Wheeler | Mar. 13, 1906 |
| 1,467,357 | Davies | Sept. 11, 1923 |
| 1,695,257 | Ohstrand | Dec. 11, 1928 |
| 2,042,167 | Beeler | May 26, 1936 |
| 2,176,183 | Kreig | Oct. 17, 1939 |

FOREIGN PATENTS

| | | |
|---|---|---|
| 400,134 | Germany | Aug. 14, 1924 |
| 244,234 | Italy | Jan. 23, 1926 |